(12) United States Patent
Picavet

(10) Patent No.: US 7,726,427 B2
(45) Date of Patent: Jun. 1, 2010

(54) BATTERY FIXING DEVICE

(75) Inventor: Christophe Picavet, Echirolles (FR)

(73) Assignee: A. Raymond et Cie, Grenoble (FR)

( * ) Notice: Subject to any disclaimer, the term of this patent is extended or adjusted under 35 U.S.C. 154(b) by 252 days.

(21) Appl. No.: 12/088,267

(22) PCT Filed: Jul. 26, 2006

(86) PCT No.: PCT/EP2006/007383

§ 371 (c)(1),
(2), (4) Date: Mar. 27, 2008

(87) PCT Pub. No.: WO2007/039003

PCT Pub. Date: Apr. 12, 2007

(65) Prior Publication Data

US 2009/0044997 A1  Feb. 19, 2009

(30) Foreign Application Priority Data

Oct. 5, 2005   (FR) ................. 05 10184

(51) Int. Cl.
*B60R 16/04* (2006.01)
(52) U.S. Cl. ................. 180/68.5; 429/100
(58) Field of Classification Search ............. 180/68.5; 429/100
See application file for complete search history.

(56) References Cited

U.S. PATENT DOCUMENTS

| 2,947,373 A | * | 8/1960 | Wilson | 180/68.5 |
| 4,754,827 A | * | 7/1988 | Hirabayashi | 180/68.5 |
| 5,484,667 A | * | 1/1996 | Sahli et al. | 429/100 |
| 5,983,612 A | * | 11/1999 | Bauswell et al. | 56/11.9 |
| 6,230,834 B1 | * | 5/2001 | Van Hout et al. | 180/68.5 |
| 7,389,841 B2 | * | 6/2008 | Boville | 180/68.5 |
| 7,607,502 B2 | * | 10/2009 | Boville | 180/68.5 |
| 2005/0225283 A1 | | 10/2005 | Boville | |

FOREIGN PATENT DOCUMENTS

| DE | 10230492 A1 | 1/2004 |
| EP | 0429746 A1 | 6/1991 |
| EP | 1378389 A1 | 1/2004 |
| FR | 2779010 A1 | 11/1999 |
| FR | 2796494 A1 | 1/2001 |

\* cited by examiner

*Primary Examiner*—S. Joseph Morano
*Assistant Examiner*—Erez Gurari
(74) *Attorney, Agent, or Firm*—Baker & Daniels LLP

(57) ABSTRACT

The invention relates to a device (10) for fixing a battery (11), consisting of a support tray (12) comprising an essentially-flat support face (16) and two longitudinal flanges (17a, 17b). According to the invention, the first longitudinal flange (17a) comprises fixed lugs (20) which serve as positioning stops for a first lug (14a) of the battery (11). The support tray (12) comprises mobile lugs (21) which are connected to the second longitudinal flange (17b) and which each define a first blocking surface (22) for a second lug (14b) of the battery (11). The fixing device (10) comprises elastically-deformable actuation levers (25) which are associated with the mobile lugs (21) and a locking ramp (26) which co-operates with each mobile lug (21) and each corresponding actuation lever (25) such as to lock the battery (11) in position in the support tray (12).

10 Claims, 8 Drawing Sheets

BATTERY FIXING DEVICE

BACKGROUND OF THE INVENTION

1. Field of the Invention

The present invention concerns a hold-down device for a battery, particularly for automotive vehicles.

2. Description of the Related Art

In all types of automotive vehicles, the battery is a standard component whose dimensions are governed by precise standards. There are various types of known hold-down devices for placing and immobilizing the battery on the chassis of the vehicle. A first type of known hold-down device utilizes the upper surface of the battery and a second type of known hold-down device utilizes the lugs of the battery.

A first example of a hold-down device utilizing the upper surface of the battery consists in resting the battery on a support tray, placing two vertical rods one on each side of the battery and positioning a bracketing element that connects the two vertical rods above the battery. The hold-down device then exerts a vertical clamping action on the battery by bearing on its upper surface. The rods generally have threaded ends that pass through the bracketing element and cooperate with nuts to bring about the clamping action. However, this type of device calls for the use of tools, especially for tightening the nuts, and the manipulation of the various parts is exacting.

Other examples of hold-down devices utilizing the upper surface of the battery consist in employing a support tray having raised side walls replacing the vertical rods and cooperating with a bracketing element that connects the two walls of the tray and is fixed by one or two anchoring points. Another example of a hold-down device uses a simple fabric strap surrounding the battery with its ends fastened on one and the other side of the battery.

However, all these examples of hold-down devices utilizing the upper surface of the battery have proven overly complex, since they are made up of several easy-to-lose parts and necessitate the use of tools for installing and removing the battery. Furthermore, the retention of the battery in its support tray is not safeguarded.

A first example of a hold-down device utilizing the lugs of the battery is a metal clamp integral to the support tray and made to bear against a lug of the battery. The clamp is fixed to the support tray, for example by a screw fastening system, and produces a high clamping pressure on the lug of the battery. However, tools still have to be used to install and remove the battery, and the hold-down device is made up of several parts that are hard to manipulate. In addition, the production cost of such a device is still high.

Another example of a hold-down device utilizing the lug of the battery is a pivoting cam system. One side of the battery is gripped in a fixed lug on the support tray and the other side of the battery cooperates with a cam system mounted to rotate parallel to the support tray. The cam is set in motion manually by an eccentric, which comes to bear against the lug of the battery in the locking position, while at the same time applying a clamping force to the lug. However, this type of device also requires the use of a screwdriver-type tool, especially during the removal of the battery. In addition, dust can come to foul the internal friction zones of the hold-down device. This then creates difficulties in removing the battery.

Another example is given by the document FR 2 796 494, which describes a battery hold-down device that is an integral part of the support tray. As illustrated schematically in FIG. 1, the hold-down device 10 for a battery 11 comprises a support tray 12 with a first flange 13a, serving as a stop for a first lug 14a of the battery 11. The support tray 12 comprises a second flange 13b provided with a deformable tab 15, articulated in rotation according to arrow F1 and designed to quickly immobilize and release the battery 11. The immobilizing is done by pressing the second lug 14b of the battery 11 against the tab 15, which deforms, thereby making it possible to position the battery 11 on the floor of the support tray 12. The battery 11 is loosened by exerting a pressure according to arrow F2 on the free end of the tab 15, which then releases the second lug 14b of the battery 11 and allows the battery 11 to be disengaged.

Although this type of device avoids the use of tools, it does not ensure safeguarded retention of the battery 11 in the support tray 12 and does not make it possible to determine whether the lug of the battery is actually in place. In addition, such a hold-down device does not permit positive locking of the battery in the support tray.

SUMMARY OF THE INVENTION

The present invention provides a simple and inexpensive battery hold-down device of reduced weight and space consumption, permitting quick and reliable locking and unlocking of a standard battery on its support tray without the need to use tools.

The subject of the invention is characterized in that the support tray comprises at least one movable lug, connected to the second longitudinal flange and cooperating with a corresponding actuating lever and defining a first immobilizing surface for the second lug of the battery; and a locking means comprising a locking ramp that inserts itself between each movable lug and each corresponding actuating lever, said ramp comprising at least one locking wedge having a first, lower inclined surface associated with a second immobilizing surface of the corresponding movable lug, and a second, upper inclined surface associated with the corresponding actuating lever and designed to ensure positive locking of the actuating lever between a first, locking position that locks the position of the battery in the support tray and a second, unlocking position.

Such a hold-down device, employing a locking ramp cooperating both with movable lugs of the support tray and with actuating levers, makes it possible to effectively immobilize the position of the battery in its support tray and to ensure effective, reliable locking of that position.

In one embodiment, each movable lug is connected to the corresponding longitudinal flange of the support tray by means of two flexible connecting ridges that form elastic hinges and make it possible to shift the movable lug between a first, idle position, awaiting the battery, and a second position immobilizing the battery.

Such flexible hinges facilitate the drawing back of the movable lugs and their automatic return to their initial position.

In another embodiment of the invention, the upper surface of each locking wedge is provided with a plurality of notches.

The notches of the locking wedges ensure positive locking of the actuating levers to the locking ramp, preventing any inadvertent disengagement of the actuating levers.

In another embodiment, the locking ramp comprises a plurality of locking wedges, interconnected by rigid, high-mechanical-strength connection zones, and the support tray comprises a plurality of movable lugs, each associated with a corresponding actuating lever, which in turn is associated with a corresponding locking wedge. The actuating levers are connected in their respective upper portions by connecting bars that serve as gripping means for the levers.

Such a hold-down device is therefore easy to manipulate and ensures safeguarded locking of the position of the battery, since all the levers are simultaneously made to move toward the locking position.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
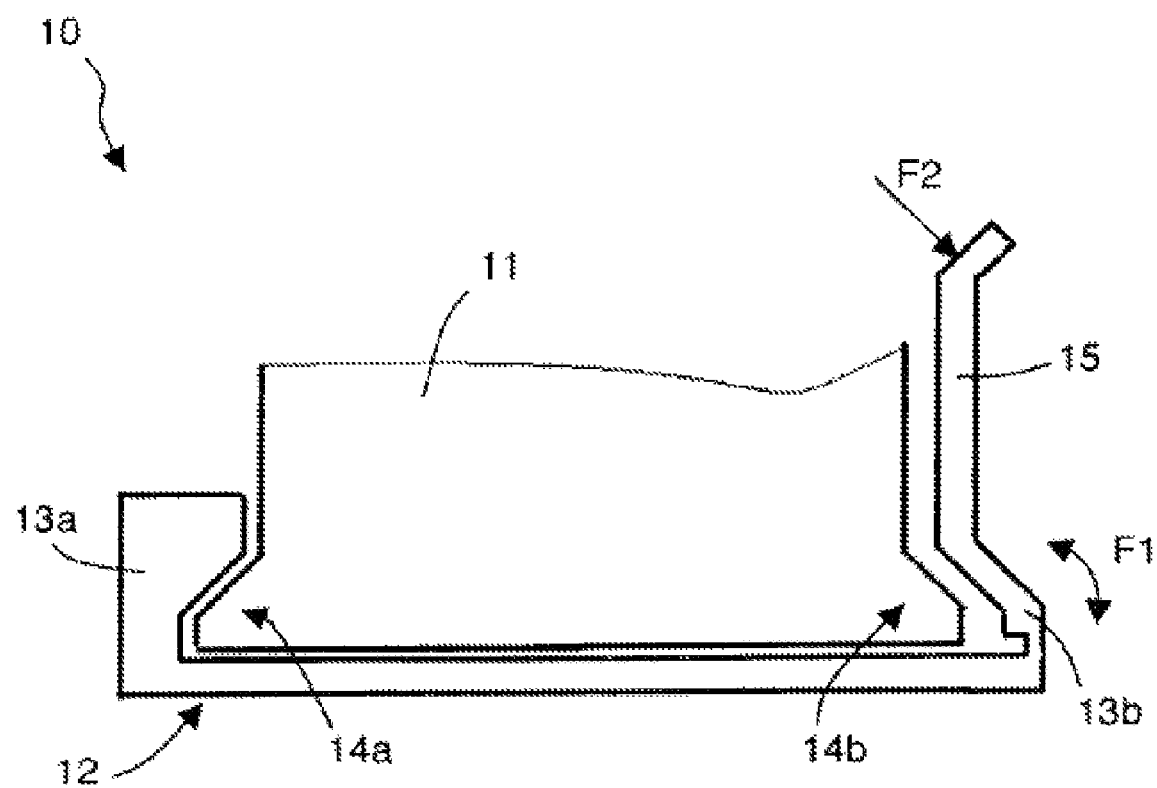
FIG. 1 schematically illustrates a partial view of a battery hold-down device according to the prior art.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

Figure 2:
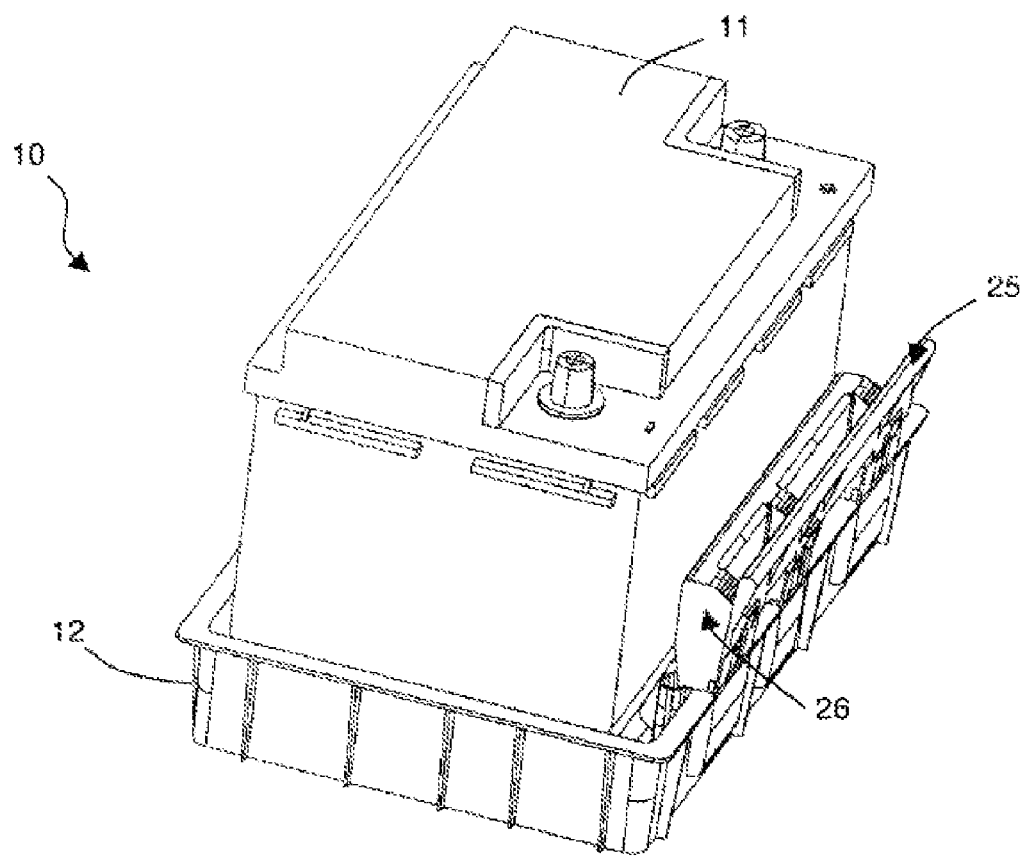
FIGS. 2 and 3 respectively illustrate a perspective view and a partial cutaway front view of a hold-down device according to the invention, on which a battery is positioned.
Figure 3:
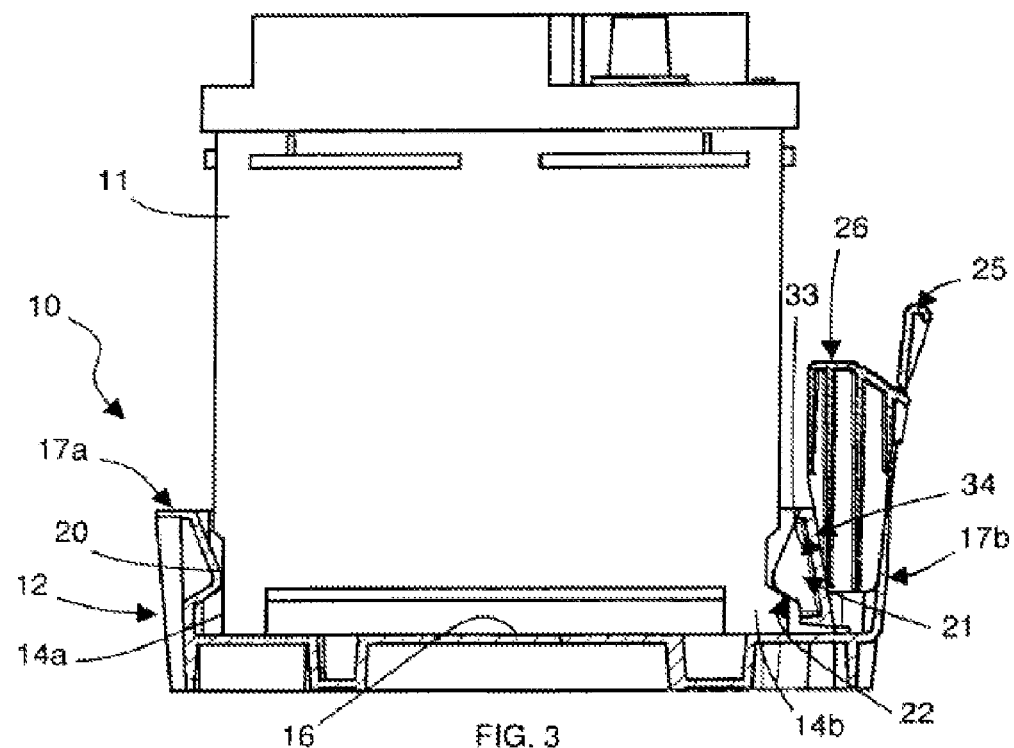

Referring to FIGS. 2 and 3, the hold-down device 10 is designed particularly to fix a battery 11 on the chassis of an automotive vehicle. Regardless of the standardized dimensions of the battery 11, the hold-down device 10 comprises a standard support tray 12 of substantially rectangular overall shape, capable of receiving all types of batteries, and a locking ramp 26 serving to lock the position of the battery 11 in its support tray 12.

The hold-down device 10 according to the invention therefore makes it possible, on the one hand, to immobilize the battery 11 in its support tray 12, and, on the other hand, to lock the position of the battery 11. The hold-down device 10 shifts from a first, locking position (FIGS. 2 and 3), in which the battery 11 is solidly fixed, to a second, unlocking position (FIGS. 11 to 14 and 18-19), in which the battery 11 can be removed.

In FIGS. 4 to 7, the support tray 12 of the battery 11 comprises a substantially planar resting surface 16 on which the battery 11 rests after being installed, two longitudinal flanges 17a, 17b and two transverse flanges 18a, 18b. The support tray 12 is preferably designed with a material that will make it possible to withstand various types of chemical attack, particularly by agents found in the body of the battery 12.

Figure 5:
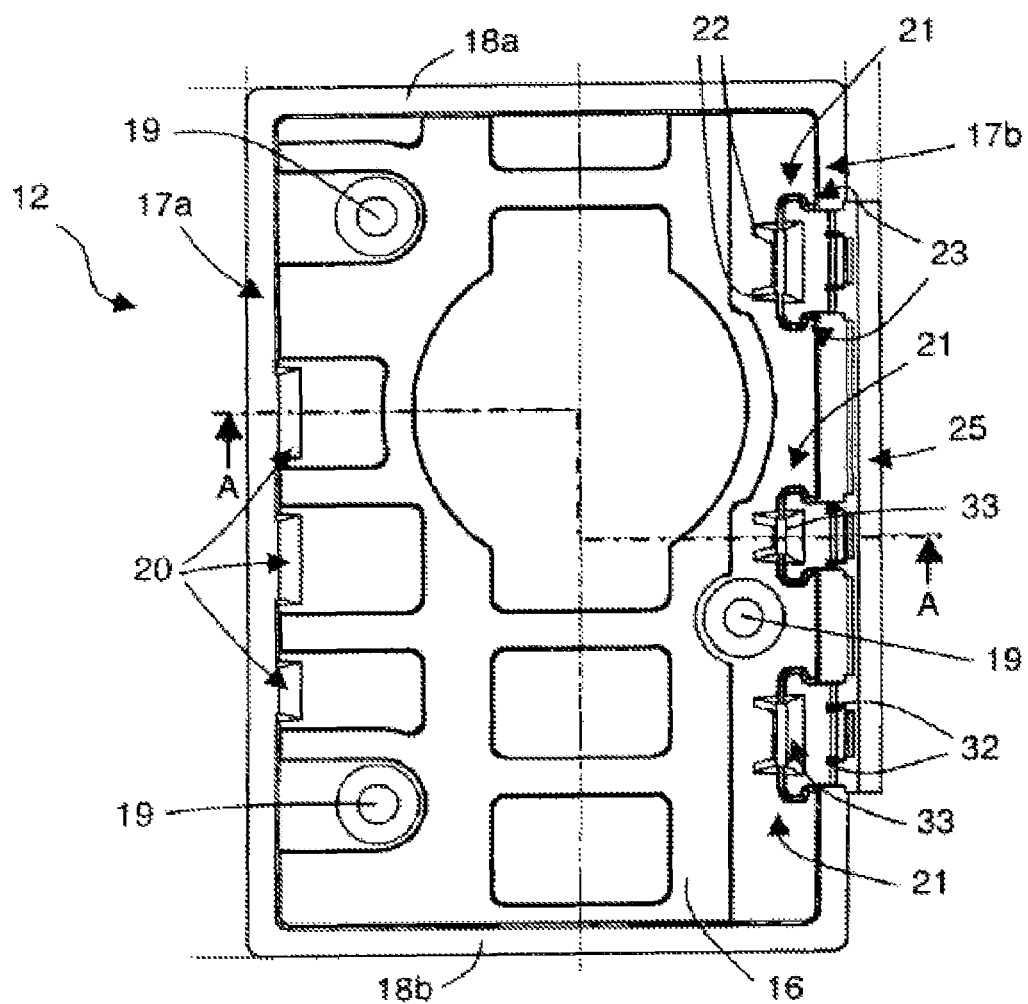

In FIG. 5, three fastener holes 19 have been pierced through the resting surface 16 of the support tray 12 in order to fasten the hold-down device 10 to the chassis of the vehicle or any other specific support.

Figure 6:
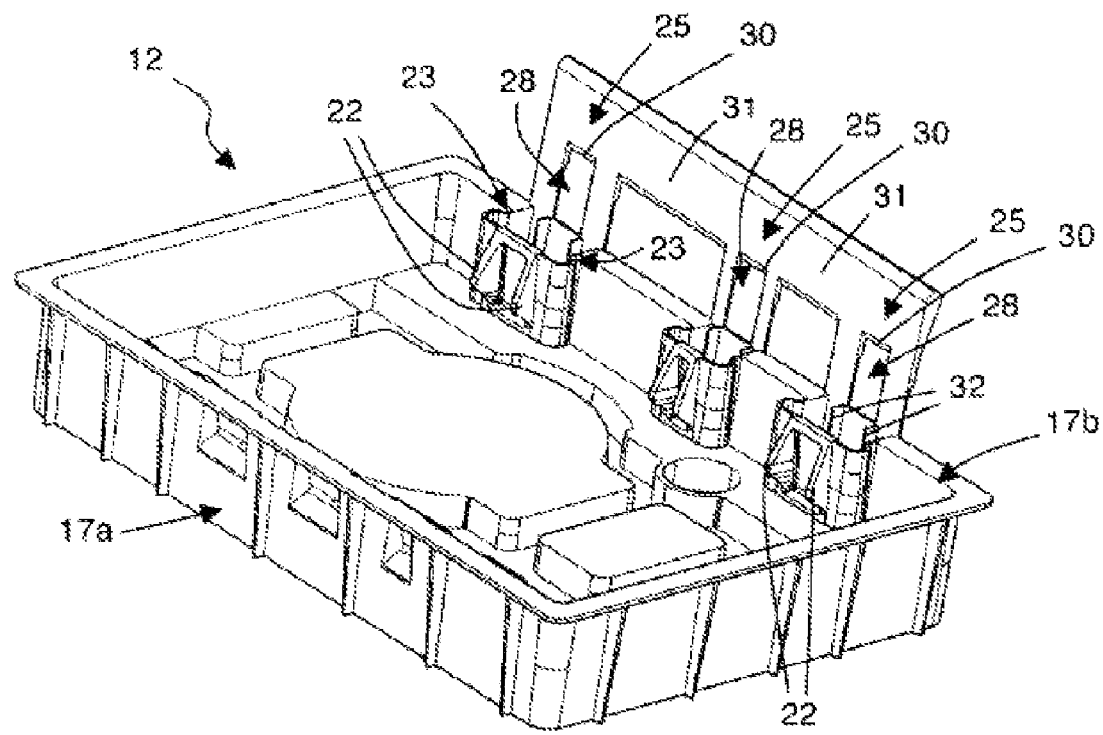
FIGS. 6 and 7 show two perspective views of the support tray according to FIGS. 4 and 5.
Figure 7:
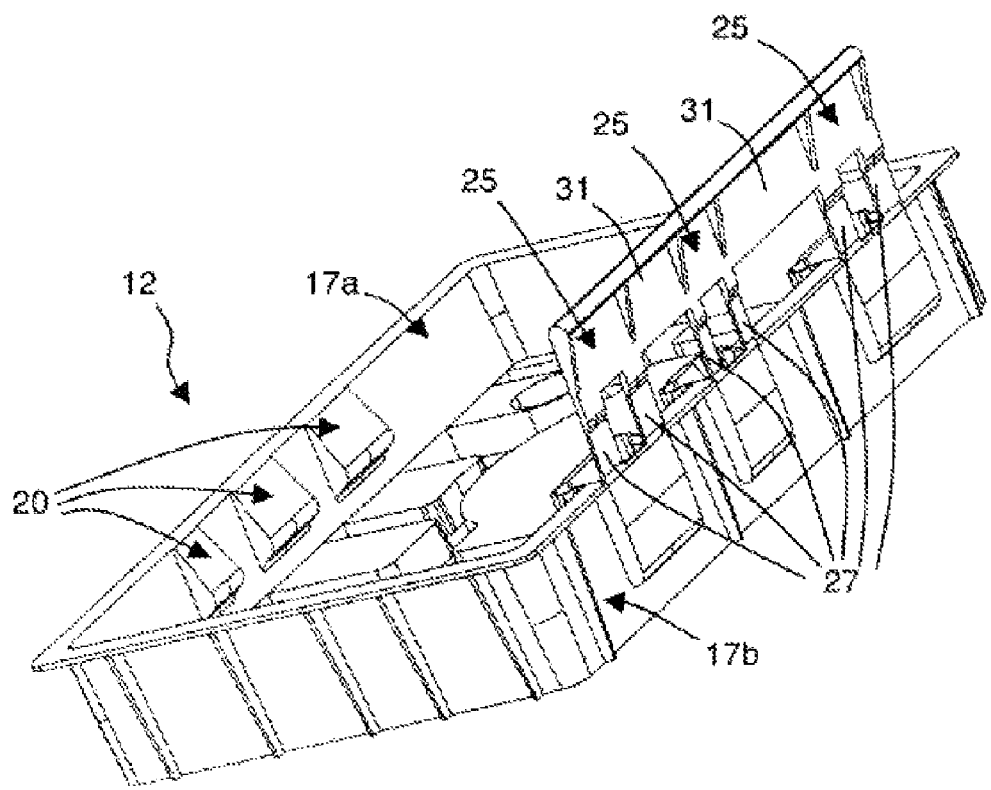

The first longitudinal flange 17a preferably comprises three fixed lugs 20 projecting from said longitudinal flange 17a toward the inside of the support tray 12 and designed to cooperate with the first lug 14a of the battery 11 (FIG. 3). The fixed lugs 20 are of one piece with the support tray 12 and are configured to the longitudinal flange 17a, such that they cooperate with the corresponding shape of lug 14a of the battery 11. The fixed lugs 20 are preferably positioned in a median section of longitudinal flange 17a, particularly so that they can be used regardless of the size of the battery 11 (FIGS. 5 to 7).

The support tray 12 preferably comprises three movable lugs 21 capable of shifting between a first, idle position, in which the support tray 12 and the movable lugs 21 await the positioning of the battery 11 (FIGS. 4 to 7 and 11), and a second, immobilizing position, in which the second lug 14b of the battery 11 is completely immobilized by the movable lugs 21 (FIGS. 2, 3 and 15 to 17).

Each movable lug 21 is configured to cooperate with the corresponding shape of the second lug 14b of the battery 11 (FIG. 3). Each movable lug 21 comprises two reinforcing ribs 22 (FIG. 6), defining a first immobilizing surface for lug 14b of the battery 11 (FIG. 3). The two ribs 22 reinforce the mechanical strength of the movable lugs 21 (FIGS. 5 and 6) and constitute an inclined ramp facilitating the sliding of lug 14b during the installation and removal of the battery 11.

The respective positions of the movable lugs 21 on longitudinal flange 17b are advantageously offset from the respective positions of the fixed lugs 20 on longitudinal flange 17a (FIG. 5). This configuration enables the support tray 12 to adapt to all sizes of battery 11 and makes it possible to optimize the immobilization of the battery 11.

In FIGS. 5 and 6, each movable lug 21 is connected to longitudinal flange 17b by two flexible ridges 23 forming elastic hinges that are capable of deforming during the installation of the battery 11 in and its removal from the support tray 12. The flexible ridges 23 have substantially S-shaped sections and deform elastically to act as springs. The flexible ridges 23 absorb the longitudinal stresses generated by the installation of the battery 11, so that the movable lugs 21 can travel parallel to the resting surface 16 of the support tray 12, in the direction of longitudinal flange 17b.

Figure 4:
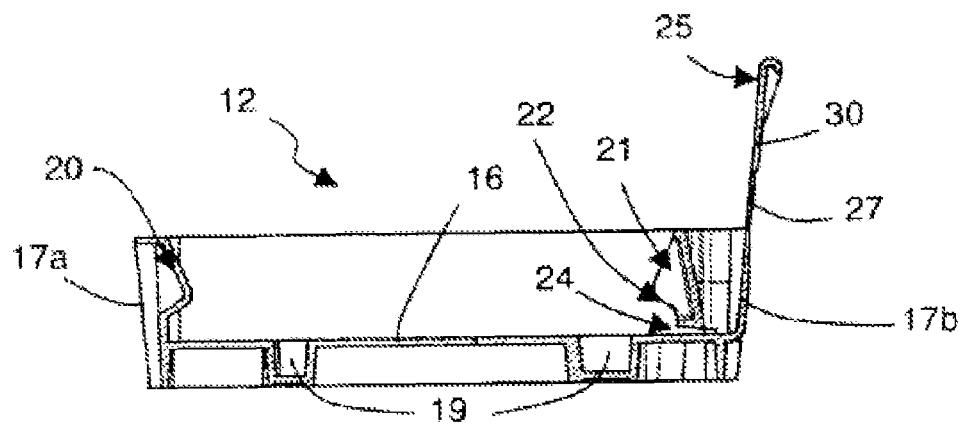
FIGS. 4 and 5 respectively illustrate a front sectional view along axis A-A and a top view of a support tray of the hold-down device according to FIGS. 2 and 3.

In addition, as depicted in FIG. 4, each movable lug 21 is connected solely to the corresponding longitudinal flange 17b and not to the resting surface 16 of the support tray 12, to allow the movable lugs 21 to draw back longitudinally in the direction of longitudinal flange 17b. Each movable lug 21 thus delimits an empty space 24 extending between the resting surface 16 of the support tray 12 and the respective bottom ends of the reinforcing ribs 22 defining the first immobilizing surface of the movable lug 21. This empty space 24 particularly constitutes a compensating play that is necessary for the movements of the lug 14b and the battery 11, to make up for the size differences between standard batteries 11.

In FIGS. 4, 6 and 7, longitudinal flange 17b of the support tray 12 is preferably prolonged by three actuating levers 25 extending substantially perpendicularly to the resting surface 16 of the support tray 12 and at the level of the movable lugs 21. The levers 25 form a single piece with the support tray 12 and act as locking/unlocking levers designed to cooperate with the movable lugs 21 and the locking ramp 26 (FIGS. 2 and 3) to lock the position of the battery 11 in the support tray 12.

For this purpose, each actuating lever 25 is elastically deformable and is rotationally mounted on longitudinal flange 17b, at the level of each movable lug 21, by means of hinge elements 27 formed, for example, by a narrowing of material in the thickness of the levers 25 (FIGS. 4 and 7). The hinge elements 27 enable the actuating levers 25 to move rotationally with respect to their lower portion connecting them to longitudinal flange 17b, between a locking position of the hold-down of the battery 11 in the support tray 12 (FIGS. 2 and 3) and an unlocking position of the hold-down of the battery 11 (FIGS. 4 to 7). By way of example, the hinge elements 27 are elements of rectangular section designed to withstand a high tensile load.

The actuating levers 25 are advantageously connected in their respective upper portions by a bar 31 serving as a grasping member that facilitates the simultaneous manipulation of the actuating levers 25 (FIGS. 6 and 7). Locking is thereby facilitated and made more reliable.

Figure 8:
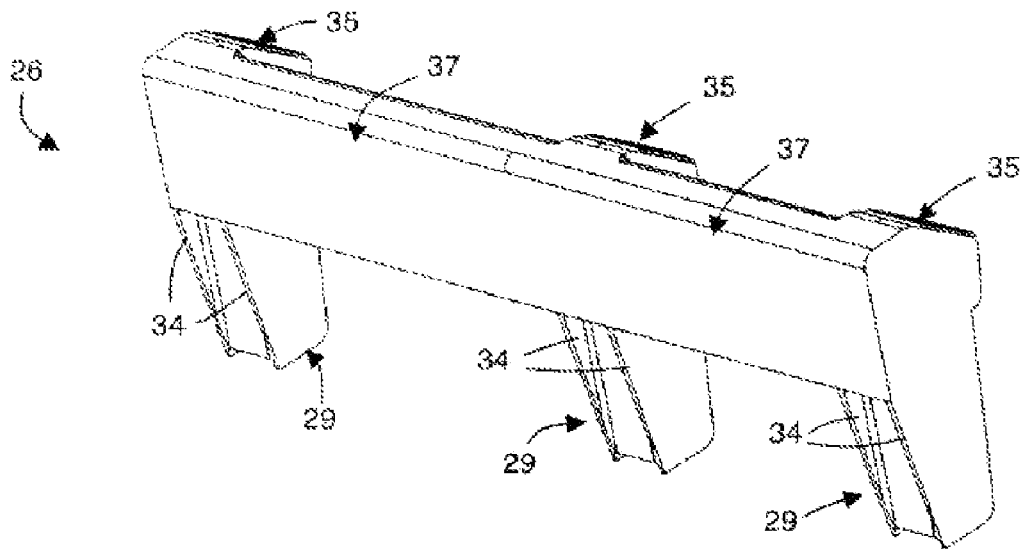
FIGS. 8 and 9 show two perspective views of a locking ramp of the hold-down device according to FIGS. 2 and 3.
Figure 9:
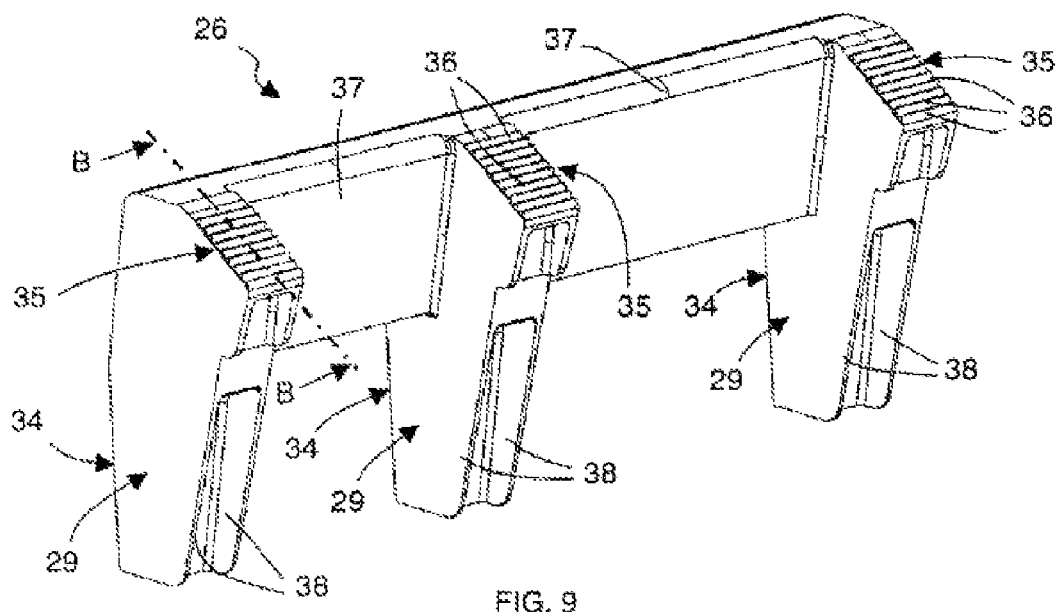
Figure 10:
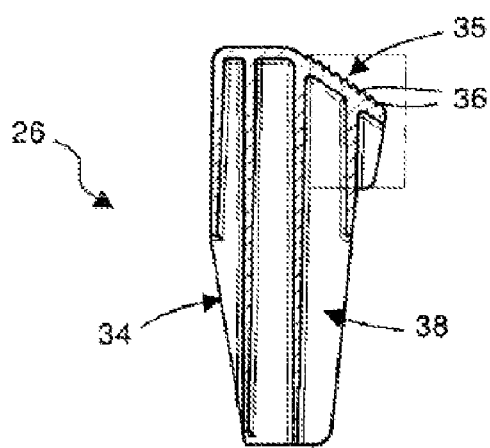
FIG. 10 is a side sectional view along axis B-B of the locking ramp according to FIGS. 8 and 9.

In FIGS. 8 to 10, the locking ramp 26 of the hold-down device 10 according to the invention is preferably provided with three locking wedges 29 designed to cooperate with the movable lugs 21 and the corresponding actuating levers 25 to immobilize and lock the position of the battery 11 in its support tray 12.

Each actuating lever 25 comprises an opening 28 delimited by the hinge elements 27 and designed to cooperate with a locking wedge 29 of the ramp 26. Each opening 28 is provided with a beveled edge 30 projecting toward the inside of the opening 28 and designed to cooperate with the locking wedge 29, as described below.

In FIGS. 5 and 6, the support tray 2 also comprises guide grooves 32 formed so as to project from longitudinal flange 17b in the direction of the corresponding movable lug 21 and in prolongation of the opening 28 in each actuating lever 25. The grooves 32 cooperate with each locking wedge 29 of the ramp 26 (FIGS. 2 and 3) to center the locking wedges 29 in their descending movement.

In FIGS. 8 to 10, the locking ramp 26 comprises three locking wedges 29, each cooperating with the opening 28 in a respective actuating lever 25 and a corresponding movable lug 21 of longitudinal flange 17b. Each locking wedge 29 interposes itself between a second immobilizing surface 33 of the associated movable lug 21 (FIGS. 3 and 5) and longitudinal flange 17b of the support tray 12.

Each locking wedge 29 comprises two centering ribs 34 defining a first, lower inclined surface (FIG. 10). The centering ribs 34 of each locking wedge 29 position themselves and slide on one and the other side of the second immobilizing surface 33 of the corresponding movable lug 21 during the placement of the locking ramp 26. The ribs 34 thus serve to optimize and improve the placement of the locking ramp 26.

As illustrated in FIG. 3, the first, lower face 34 of each locking wedge 29 bears against the second immobilizing surface 33 of each associated movable lug 21, and the first immobilizing surface 22 of each movable lug 21 thus exerts a very strong pressure on lug 14b of the battery 11.

Each locking wedge 29 also has a second, upper inclined surface 35, cooperating with the opening 28 in the corresponding actuating lever 25 (FIGS. 2 and 3).

The upper inclined surface 35 of each locking wedge 29 is provided with a series of notches 36 designed to cooperate with the beveled edge 30 of the opening 28 in the corresponding actuating lever 25. The notches 36 have a slight inclination (FIG. 10), to ensure positive locking of the actuating lever 25 to the associated locking wedge 29 and to prevent inadvertent disengagement of the lever 25. The notches 36 also make it possible to compensate for dimensional differences in the batteries 11 by offering different positioning options for the actuating levers 25.

The locking wedges 29 pass through the openings 28 in the actuating levers 25 during the locking of the hold-down of the battery 11 in the support tray 12. The beveled edges 30 of the openings 28 accordingly place themselves in one of the notches 36 in the upper surfaces 35 of the locking wedges 29, depending on the size of the battery 11.

In addition, the locking wedges 29 of the ramp 26 are advantageously connected by connection zones 37 of substantially rectangular section, which are sufficiently rigid to be manipulated by hand. Connection zones 37 have a high mechanical strength, since the loads applied by the user are exerted primarily on said connection zones 37.

Each locking wedge 29 also comprises positioning ribs 38 cooperating with the guide grooves 32 formed against longitudinal flange 17b. The positioning ribs 38 of the locking wedges 29 and the guide grooves 32 of second longitudinal flange 17b serve in particular to optimize the positioning of the locking ramp 26. This results in optimum centering of the locking wedges 29 between movable lugs 21 and longitudinal flange 17b.

The installation of the battery 11 in the support tray 12 of the hold-down device 10 according to the invention, the locking of its position and the removal of the battery 11 will be described in more detail with regard to FIGS. 11 to 19.

Figure 11:
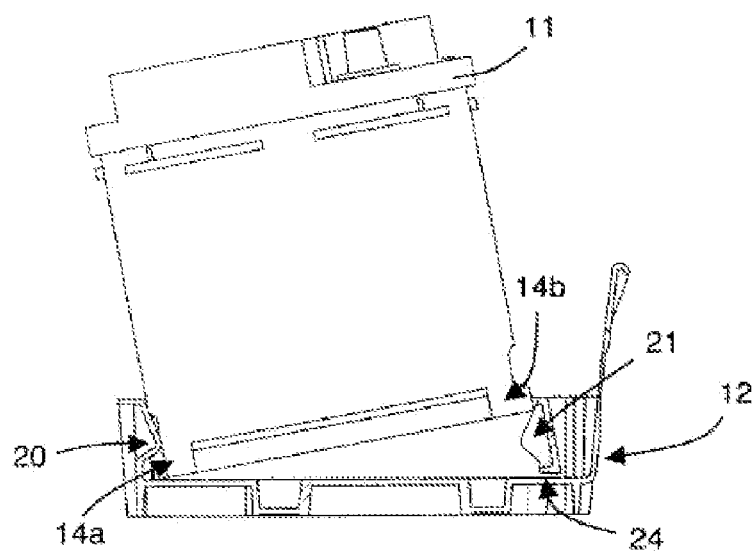
FIGS. 11 to 17 show various successive steps in the installation of a battery on the hold-down device according to FIGS. 2 to 10.

In FIG. 11, the battery 11 is put in place in the support tray 12 by first lodging the first lug 14a in abutment under the fixed lugs 20 of the support tray 12. The battery 11 thus is inclined in abutment against the fixed lugs 20 and in bearing relation on the movable lugs 21 of the support tray 12.

Figure 12:
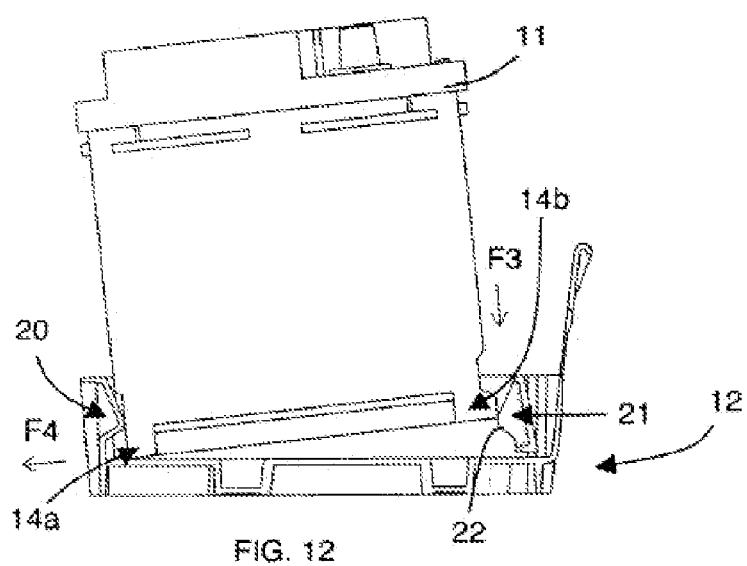
Figure 13:
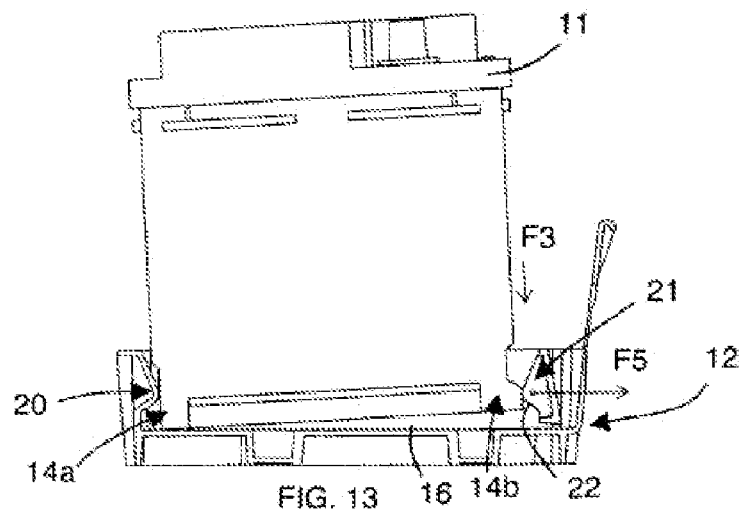

In FIGS. 12 and 13, a pressure exerted by the battery 11 according to arrow F3 causes the first lug 14a of the battery 11 to slide over the resting surface 16 of the support tray 12, according to arrow F4, toward the respective roots of the fixed lugs 20. The second lug 14b of the battery 11 slides along the respective first surfaces 22 of the movable lugs 21, causing said movable lugs 21 to draw back according to arrow F5 (FIG. 13). The movable lugs 21 shift backward in parallel with the resting surface 16 of the support tray 12.

Figure 14:
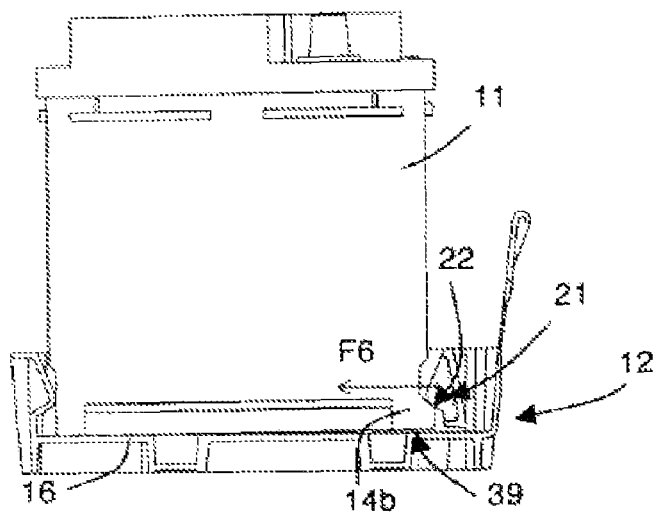

In FIG. 14, the battery 11 is positioned on the resting surface 16 of the support tray 12. The movable lugs 21 have returned to their idle position, according to arrow F6, by virtue of the elastic return effect generated by the flexible ridges 23 of the movable lugs 21. The lugs 14a and 14b of the battery 11 are then immobilized, respectively by the fixed lugs 20 and the first immobilizing surfaces 22 of the movable lugs 21. A small empty space 39 is still present between the second lug 14b of the battery 11 and the resting surface 16 of the support tray 12, since the clamping action generated by the movable lugs 21 is not maximal.

In the position illustrated in FIG. 14, the first phase of installing the battery 11 in the support tray 12 has been completed. It is now necessary to lock this position by means of the locking ramp 26, to prevent any inadvertent disassembly of the battery from the support tray 12.

Figure 15:
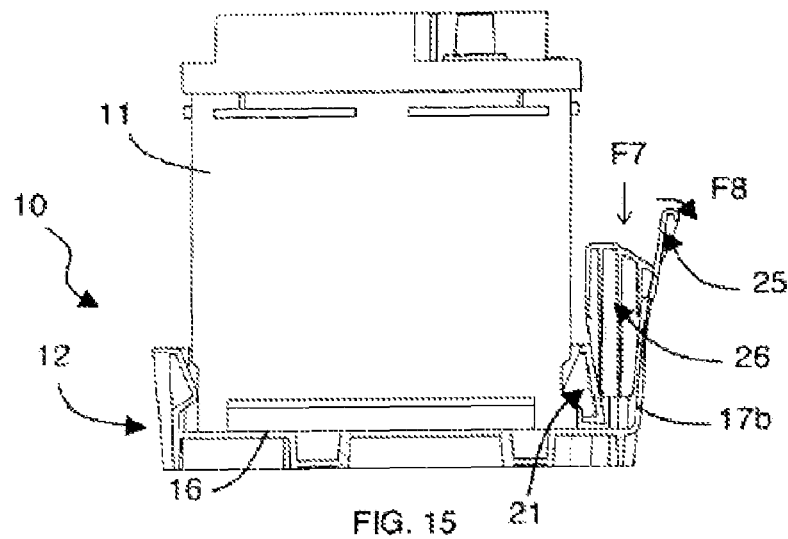

In FIG. 15, the locking ramp 26 is put in place between the movable lugs 21 and the actuating levers 25, according to arrow F7, by sliding the centering ribs 34 of each locking wedge 29 along the second immobilizing surface 33 of the movable lugs 21 and sliding the positioning ribs 38 along the guide grooves 32 of the second longitudinal flange 17b. The actuating levers 25 thus pivot slightly according to arrow F8 during the insertion of the locking ramp 26. The positioning of the locking wedges 29 also causes the battery 11 to be applied flatly to the resting surface 16 of the support tray 12 and eliminates the residual empty space 39 described above.

This results in complete and maximal immobilization of the battery 11 in the support tray 12.

Figure 16:
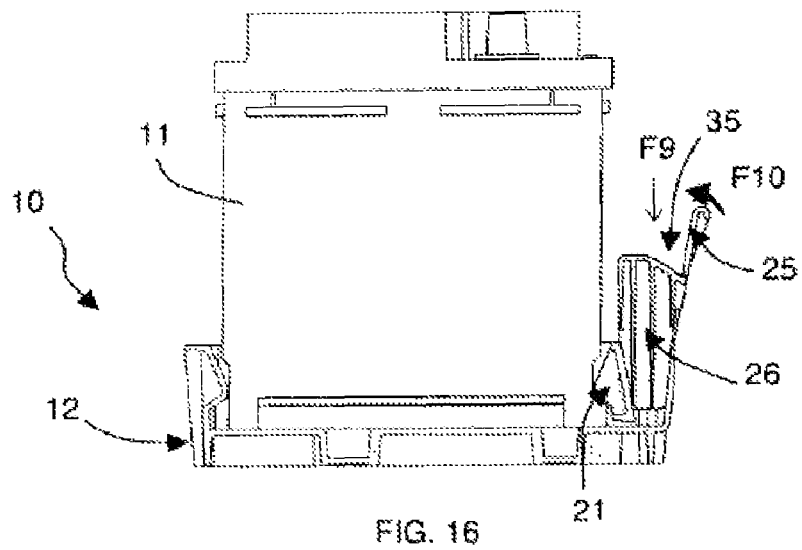

In FIG. 16, the phase of locking the position of the battery 11 in the support tray 12 is carried out by simultaneously applying pressure to the locking ramp 26 according to arrow F9 and by rotating the actuating levers 25, according to arrow F10, toward the inside of the support tray 12 above the locking ramp 26. The locking wedges 29 of the ramp 26 then pass through the openings 28 in the actuating levers 25, which position themselves at the level of the respective upper surfaces 35 of the locking wedges 29. This step represents a coarse adjustment of the locking of the position of the battery 11 in its support tray 12. In addition, the clamping action caused by the actuating levers 25 forces the locking ramp 26 to tighten the movable lugs 21 still further by making the locking wedges 29 descend slightly.

Figure 17:
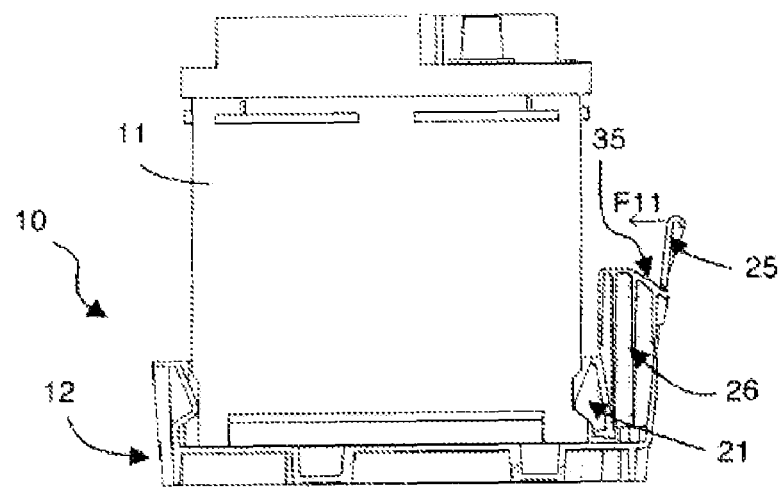

In FIG. 17, the locking phase is completed by applying a substantially horizontal thrust, according to arrow F11, to the actuating levers 25 so as to place them in a notch 36 in one of the upper surfaces 35 of the locking wedges 29 that corresponds to the maximum position attainable by the actuating levers 25. The lock is then positive and prevents inadvertent disengagement of the levers 25. This phase represents a fine adjustment of the locking of the position of the battery 11 in its support tray 12.

Figure 18:
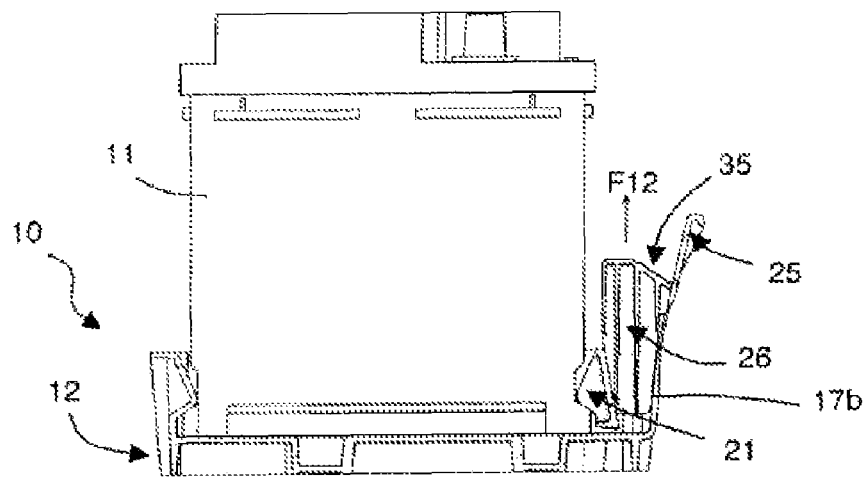
FIGS. 18 and 19 show two successive steps in the removal of the battery from the hold-down device according to FIGS. 2 to 17.

In FIG. 18, the unlocking of the battery 11 is performed simply by actuating the levers 25 in the opposite direction to that of arrows F10 and F11 in FIGS. 16 and 17. The slight inclination of the notches 36 in the upper surfaces 35 of the locking wedges 29 makes it possible to disengage the levers 25. The locking ramp 26 is then released from the lock produced by the actuating levers 25. All that remains is to remove the locking ramp 26 according to arrow F12.

Figure 19:
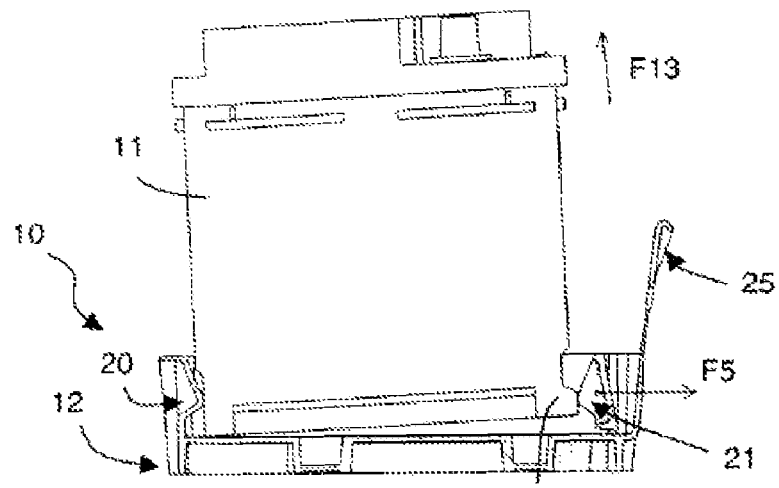

In FIG. 19, the removal of the battery 11 from its support tray 12 then consists in lifting it according to arrow F13 while pivoting it around the fixed lugs 20 of the support tray 12. The movable lugs 21 thereupon draw back according to arrow F5, enabling the second lug 14b of the battery 11 to disengage from the movable lugs 21. The battery 11 is then removed from the support tray 12.

Such a hold-down device 10 for a battery 11, permitting easy installation and removal, as described above, is therefore simple and inexpensive and features reduced weight and space consumption. It serves simultaneously to immobilize and lock the position of the battery 11 in its support tray 12 in an effective and reliable manner.

The hold-down device 10 has only one moving part in addition to the support tray 12, namely the locking ramp 26, for holding down and locking the battery 11. The notched upper surfaces 35 of the locking wedges 29 permit effective positive locking of the actuating levers 25.

In addition, the actuating levers 25 are connected to one another for better gripping and faster and more reliable manipulation. The locking and unlocking of the battery 11 are simple and quick and are performed without tools.

The invention is not limited to the various embodiments described hereinabove. In FIGS. 2 to 19, the hold-down device 10 comprises three fixed lugs 20 and three movable lugs 21, so that it is able to hold down all standard battery sizes. Obviously, the device 10 can have a different number of movable lugs 21 and fixed lugs 20, as long as the number of movable lugs 21 is equal to the number of locking wedges 29 of the locking ramp 26, which in turn is equal to the number of actuating levers 25 of the support tray 12, to ensure optimum immobilization and locking.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A hold-down device for use with a vehicle battery having first and second battery lugs, comprising:
a support tray including a substantially planar resting surface and first and second longitudinal flanges, said first longitudinal flange including at least one fixed flange lug engageable with a respective first battery lug;
a locking device associated with said second longitudinal flange, said locking device including at least one actuating lever movable between a first position corresponding to the battery being immobilized in said support tray and a second position corresponding to the battery being releasable from said support tray, said locking device further including at least one movable flange lug connected to said second longitudinal flange, each said movable flange lug cooperating with said actuating lever and defining a first immobilizing surface engageable with a respective said second battery lug; and
a locking ramp insertable between each said movable flange lug and said actuating lever, said locking ramp comprising at least one locking wedge having a first, lower surface associated with a second immobilizing surface of each corresponding said movable flange lug, and a second, upper surface engagable by said actuating lever to lock said actuating lever in said first position.

2. The device of claim 1, wherein each said movable flange lug is connected to said second longitudinal flange of said support tray by at least one flexible connecting ridge forming an elastic hinge and enabling each said movable flange lug to shift between a first, idle position and a second, immobilizing position.

3. The device of claim 1, wherein each said movable flange lug is connected to said second longitudinal flange with an empty space defined between said resting surface of said support tray and a lower end of said first immobilizing surface of each said movable flange lug.

4. The device of claim 1, wherein said upper surface of each said locking wedge includes a plurality of notches.

5. The device of claim 1, wherein said locking ramp includes a plurality of said locking wedges interconnected by rigid connection zones, and said support tray includes a plurality of said movable flange lugs, each associated with a portion of said actuating lever that is in turn associated with a corresponding said locking wedge.

6. The device of claim 5, wherein said portions of said actuating lever are interconnected by connecting bars that are graspable by a user.

7. The device of claim 1, wherein each said portion of said actuating lever includes an opening, each opening cooperating with a respective said locking wedge of said locking ramp.

8. The device of claim 7, wherein each said opening in said actuating lever includes a beveled edge engageable with said upper surface of a respective said locking wedge.

9. The device of claim 1, wherein said lower surface of each said locking wedge is defined by a pair of centering ribs positionable on opposite sides of said second immobilizing surface of each said corresponding movable flange lug.

10. The device of claim 1, wherein said second longitudinal flange includes guide grooves provided in said actuating lever, said guide grooves oriented to guide the positioning of corresponding said locking wedges of said locking ramp.

* * * * *